(12) United States Patent
Natarajan et al.

(10) Patent No.: US 10,642,621 B2
(45) Date of Patent: May 5, 2020

(54) SYSTEM, APPARATUS AND METHOD FOR CONTROLLING ALLOCATIONS INTO A BRANCH PREDICTION CIRCUIT OF A PROCESSOR

(71) Applicant: Intel Corporation, Santa Clara, CA (US)

(72) Inventors: Ragavendra Natarajan, Mysore (IN); Niranjan Soundararajan, Karnataka (IN); Sreenivas Subramoney, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 151 days.

(21) Appl. No.: 15/857,863

(22) Filed: Dec. 29, 2017

(65) Prior Publication Data

US 2019/0205143 A1 Jul. 4, 2019

(51) Int. Cl.
*G06F 9/38* (2018.01)
*G06F 9/30* (2018.01)
*G06F 9/32* (2018.01)

(52) U.S. Cl.
CPC .......... *G06F 9/3848* (2013.01); *G06F 9/3005* (2013.01); *G06F 9/321* (2013.01); *G06F 9/3806* (2013.01); *G06F 9/3844* (2013.01)

(58) Field of Classification Search
CPC .... G06F 9/3848; G06F 9/3846; G06F 9/3005; G06F 9/321; G06F 9/3806; G06F 9/3844; G06F 9/3842; G06F 9/3808
See application file for complete search history.

(56) References Cited

U.S. PATENT DOCUMENTS

| 7,203,825 | B2 | 4/2007 | Hum et al. | |
|---|---|---|---|---|
| 7,219,217 | B1 * | 5/2007 | Baweja | G06F 9/3848 712/239 |
| 2001/0056531 | A1 * | 12/2001 | McFarling | G06F 9/3848 712/239 |

(Continued)

OTHER PUBLICATIONS

U.S. Appl. No. 15/373,668, filed Dec. 9, 2016, entitled "System, Apparatus and Method for Low Overhead Control Transfer to Alternate Address Space in a Processor," by Brent R. Boswell, et al.

*Primary Examiner* — Michael J Metzger
(74) *Attorney, Agent, or Firm* — Trop, Pruner & Hu, P.C.

(57) ABSTRACT

In one embodiment, a branch prediction circuit includes: a first bimodal predictor having a first plurality of entries each to store first prediction information for a corresponding branch instruction; a global predictor having a plurality of global entries each to store global prediction information for a corresponding branch instruction; a second bimodal predictor having a second plurality of entries each to store second prediction information for a corresponding branch instruction; a monitoring table having a plurality of monitoring entries each to store a counter value based on the second prediction information for a corresponding branch instruction; and a control circuit to allocate a global entry within the global predictor based at least in part on the counter value of a monitoring entry of the monitoring table for a corresponding branch instruction. Other embodiments are described and claimed.

19 Claims, 10 Drawing Sheets

(56) References Cited

U.S. PATENT DOCUMENTS

| | | | |
|---|---|---|---|
| 2003/0065912 A1* | 4/2003 | Hum | G06F 9/3848 |
| | | | 712/239 |
| 2005/0210225 A1 | 9/2005 | Morrow | |
| 2005/0223202 A1 | 10/2005 | Peri et al. | |
| 2008/0005542 A1* | 1/2008 | Gschwind | G06F 9/3844 |
| | | | 712/239 |
| 2012/0166775 A1* | 6/2012 | Krishnamurthy | G06F 9/3848 |
| | | | 712/239 |
| 2016/0283244 A1 | 9/2016 | Jiang et al. | |

* cited by examiner

SYSTEM, APPARATUS AND METHOD FOR CONTROLLING ALLOCATIONS INTO A BRANCH PREDICTION CIRCUIT OF A PROCESSOR

TECHNICAL FIELD

Embodiments relate to performing branch prediction in a processor.

BACKGROUND

Branch prediction is used to enhance performance in wide, super-scalar processors. Conventional branch predictors use both local and global branch history components. The local predictor makes a direction prediction for a branch instruction (using an instruction pointer (IP) of the instruction) based only on the IPs behavior in the recent past. The global predictor, on the other hand, makes a direction prediction for the branch instruction based on the behavior of all the recently executed branch instructions in the program. However, these different predictors contend for resources.

DETAILED DESCRIPTION

In various embodiments, a branch predictor of a processor or other system on chip (SoC) may be implemented with multiple independent branch predictors. These independent branch predictors include a local predictor and one or more global predictors. With these two predictors, a prediction may be provided for every branch in the program. That is, the local predictor, implemented as a bimodal predictor, provides a prediction for every branch instruction, while the global predictors provide a prediction only if there is a global entry (g-entry) corresponding to the branch instruction.

Still further, techniques are provided to use an additional branch prediction structure, referred to herein as a shadow or replica local branch predictor, to aid in determination of when it is appropriate (or not) to allocate resources of the global predictor for a particular branch instruction. Embodiments may dynamically (using an online mechanism) identify instruction pointers (IPs) to filter and offload onto the local predictor. By "offloading" predictions, it is meant that for certain branch instructions, no allocation is made into the global predictor. That is, a typical scenario is for there to be contention for resources of the global branch predictor. Using information from this shadow local branch predictor and an additional history or monitoring structure, conservative decisions may be made to limit allocations into the global branch predictor. By providing an online technique to identify branch IPs that perform sufficiently well with predictions solely from the local branch predictor, global predictor allocations for such branch IPs is reduced.

Figure 1:
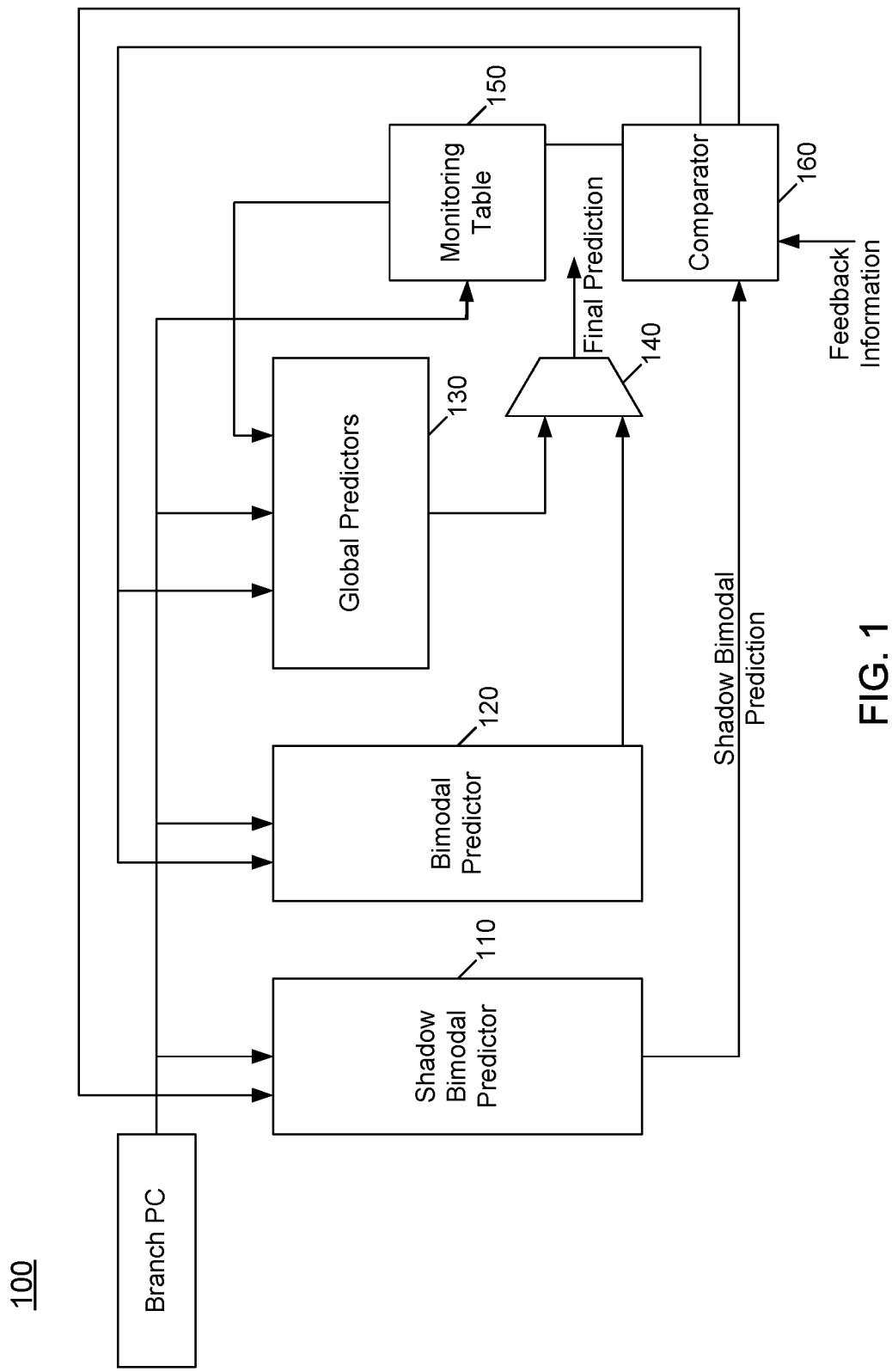
FIG. 1 is a block diagram of a prediction circuit in accordance with an embodiment of the present invention.

Referring now to FIG. 1, shown is a block diagram of a prediction circuit in accordance with an embodiment of the present invention. More specifically, prediction circuit 100 is a branch predictor having multiple independent prediction circuits or units. As such, prediction circuit 100 is implemented as a hybrid predictor that includes both local and global predictors. Further, additional prediction structures may be provided to direct more predictions to be made using a local predictor, rather than a global predictor, offloading consumption of resources of the global predictor. This may enhance performance, as in embodiments a global predictor may consume greater storage and computation resources than a local predictor. With an embodiment, more prediction decisions can be made by leveraging information from the local predictor only, reducing resource contention in the global predictor.

As illustrated in FIG. 1, prediction circuit 100 includes a local predictor 120. In the embodiment shown, local predictor 120 may be implemented as a bimodal predictor. In an embodiment, bimodal predictor 120 may include a plurality of entries each associated with a given instruction address (namely an instruction pointer (IP) address) and having a corresponding count value associated therewith. In an embodiment, local bimodal predictor 120 may be implemented as an extension of a target array (TA). In this embodiment, each bimodal entry includes a 2-bit counter. In turn, each of the entries of the TA may be extended with a bit to store the bimodal prediction (namely the most significant bit (MSB) of the bimodal counter). In an embodiment, the lower bits of the bimodal predictor entries may be tracked in a separate, IP-indexed, structure. In a particular embodiment bimodal predictor 120 may be an IP-hashed structure that maps into a set of counters in which a most significant bit (MSB) provides the direction prediction.

In addition, a set of global predictors 130 is present. In embodiments, global predictors 130 may provide for global predictions, namely predictions based on multiple recently executed branch instructions. Global predictors 130 may be implemented as a set of tables. Although the scope of the present invention is not limited in this regard, in embodiments there may be a plurality of such global tables, e.g., global tables g0-g6. Of course different numbers of global tables may be provided in other embodiments. Each such global table may be associated with a different granularity or range of history of branch instructions, such that the first global table (e.g., g0) is associated with a shortest history duration, which as an example may be on the order of between 5 and 15 branches. The higher global tables may be associated with longer history periods, e.g., ranging from approximately 100 to 200 branches.

As further shown, an additional predictor 110 is present within prediction circuit 100. More specifically, predictor 110 may be implemented as a shadow bimodal predictor. In embodiments, shadow bimodal predictor 110 may be used in determining when it is appropriate to allocate an entry within global predictors 130 for a given branch instruction. Shadow bimodal predictor 110 may be implemented similarly to bimodal predictor 120. In a particular embodiment, shadow bimodal predictor 110 may be implemented similarly as local predictor 120, with the TA entries extended with a shadow bimodal prediction bit, and a separate, IP-indexed structure for the lower bits of the shadow predictor. In embodiments, shadow predictor 110 may be used to help identify and learn the branch instructions that see an improvement in performance by using predictions solely from bimodal predictor 120.

In an embodiment, shadow bimodal predictor 110 provides a prediction for every branch instruction and a corresponding counter of the predictor may be updated at every branch execution. In contrast, bimodal predictor 120 and global predictor 130 may be updated only when a final prediction output decision from the branch predictor originates from the given predictor. Stated another way, only a predictor responsible for a given prediction is updated based on the result of that prediction (either correct or mispredicted).

As further illustrated in FIG. 1, prediction circuit 100 is implemented as a hybrid prediction structure. As seen, predictions output by local predictor 120 and global predictors 130 may be provided to a selection circuit 140 which, in an embodiment may be implemented as a multiplexer. In embodiments, selection circuit 140 may output a final prediction decision based on the predictions from these two predictors (when predictions for a corresponding IP are present therein).

Still with reference to FIG. 1, prediction circuit 100 further includes a monitoring table 150 and a comparator 160. In embodiments herein, comparator 160 is configured to receive feedback information, e.g., from an execution unit that indicates whether a given prediction output from selection circuit 140 is correct or not. That is, comparator 160 receives feedback information that includes indications of correct predictions and mispredictions. Based at least in part on this feedback information and a corresponding prediction from shadow bimodal predictor 110, comparator 160 may cause a probabilistic update to a corresponding entry within monitoring table 150 associated with a given branch instruction. And, based upon information in a given entry within monitoring table 150, an allocation may be made to one or more tables within global predictors 130.

In an embodiment, monitoring table (MT) 150 thus may be used to help keep track of the performance of shadow bimodal predictor 110. In an embodiment, each MT entry includes a saturating counter that keeps track of the number of dynamic executions of a corresponding branch instruction since the last misprediction by shadow bimodal predictor 110. The resulting count values within these MT entries in turn may be used to indicate whether or not an entry for a given branch instruction is to be allocated (or attempted to be allocated) into one or more tables of global predictor 130. If the performance of shadow bimodal predictor 110 for a given branch instruction has been shown to be above a given threshold, an allocation within global predictor 130 for that IP may be mitigated by allocating entries probabilistically. In an embodiment, allocations may be prevented only to the g4 and g5 tables, as these tables typically see the most allocation pressure, thus reducing contention for space in these tables.

Understand while shown at this high level in the embodiment of FIG. 1, many variations and alternatives are possible. Note that in embodiments, the feedback information received from the execution circuit of the processor may further be used to update prediction information in one or more of the predictors. More specifically in an embodiment, this feedback information may be used to update the corresponding predictor that provided the prediction output from selection circuit 140. In addition, for every branch execution, shadow bimodal predictor 110 may be updated.

Figure 2A:
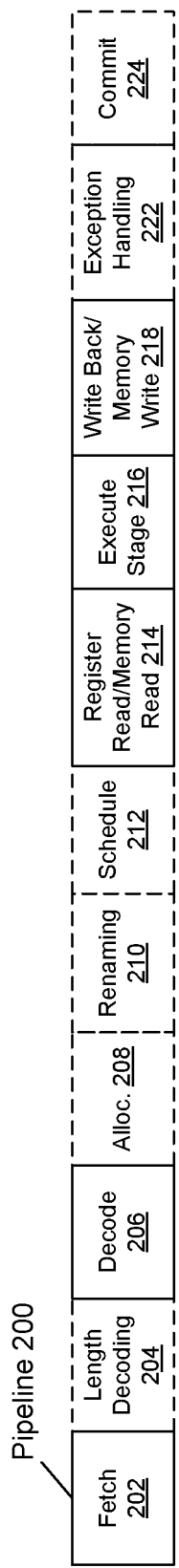
FIG. 2A is a block diagram illustrating an in-order pipeline and a register renaming stage, out-of-order issue/execution pipeline according to at least one embodiment of the invention.
Figure 2B:
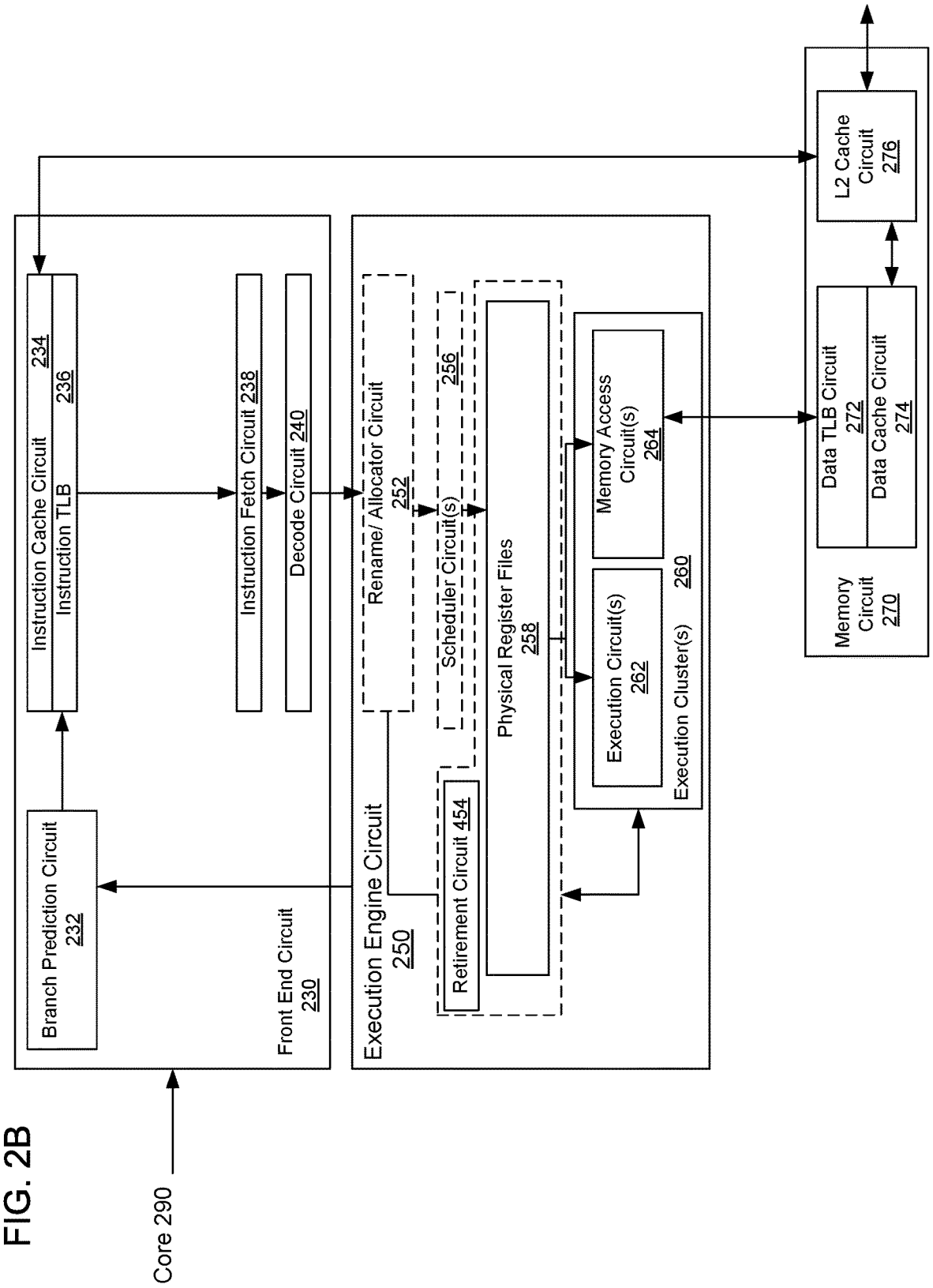
FIG. 2B is a block diagram illustrating an in-order architecture core and a register renaming logic, out-of-order issue/execution logic to be included in a processor according to at least one embodiment of the invention.

FIG. 2A is a block diagram illustrating an in-order pipeline and a register renaming stage, out-of-order issue/execution pipeline according to at least one embodiment of the invention. FIG. 2B is a block diagram illustrating an in-order architecture core and a register renaming logic, out-of-order issue/execution logic to be included in a processor according to at least one embodiment of the invention. The solid lined boxes in FIG. 2A illustrate the in-order pipeline, while the dashed lined boxes illustrate the register renaming, out-of-order issue/execution pipeline. Similarly, the solid lined boxes in FIG. 2B illustrate the in-order architecture logic, while the dashed lined boxes illustrate the register renaming logic and out-of-order issue/execution logic.

In FIG. 2A, a processor pipeline 200 includes a fetch stage 202 which may include a branch predictor as described herein, a length decode stage 204, a decode stage 206, an allocation stage 208, a renaming stage 210, a scheduling (also known as a dispatch or issue) stage 212, a register read/memory read stage 214, an execute stage 216, a write back/memory write stage 218, an exception handling stage 222, and a commit stage 224.

In FIG. 2B, arrows denote a coupling between two or more circuits and the direction of the arrow indicates a direction of data flow between those circuits. FIG. 2B shows a processor core 290 including a front end circuit 230 coupled to an execution engine circuit 250, and both are coupled to a memory circuit 270.

The core 290 may be a reduced instruction set computing (RISC) core, a complex instruction set computing (CISC) core, a very long instruction word (VLIW) core, or a hybrid or alternative core type. As yet another option, the core 290 may be a special-purpose core, such as, for example, a network or communication core, compression engine, graphics core, or the like.

The front end circuit 230 includes a branch prediction circuit 232 coupled to an instruction cache circuit 234, which is coupled to an instruction translation lookaside buffer (TLB) 236, which is coupled to an instruction fetch circuit 238, which is coupled to a decode circuit 240. Branch prediction circuit 232 may be implemented as described herein (e.g., as in FIG. 1) including local and global predictors and a shadow predictor to more effectively allocate entries into the global predictor, by leveraging the local predictor when it is determined that good prediction accuracy is achieved with use of the local predictor alone.

Decode circuit 240 may decode instructions, and generate as an output one or more micro-operations, micro-code entry points, micro-instructions, other instructions, or other control signals, which are decoded from, or which otherwise reflect, or are derived from, the original instructions. The decoder may be implemented using various different mechanisms. Examples of suitable mechanisms include, but are not limited to, look-up tables, hardware implementations, programmable logic arrays (PLAs), microcode read only memories (ROMs), etc. Instruction cache circuit 234 is further coupled to a level 2 (L2) cache circuit 276 in the memory circuit 270. Decode circuit 240 is coupled to a rename/allocator circuit 252 in the execution engine circuit 250.

Execution engine circuit 250 includes the rename/allocator circuit 252 coupled to a retirement circuit 254 and a set of one or more scheduler circuit(s) 256. The scheduler circuit(s) 256 represents any number of different schedulers, including reservations stations, central instruction window, etc. The scheduler circuit(s) 256 is coupled to the physical register files 258. Each of the physical register files 258 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register files 258 are overlapped by the retirement circuit 254 to illustrate various ways in which register renaming and out-of-order execution may be implemented (e.g., using a reorder buffer(s) and a retirement register file(s), using a future file(s), a history buffer(s), and a retirement register file(s); using a register map and a pool of registers, etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc.

The retirement circuit 254 and the physical register files 258 are coupled to the execution cluster(s) 260. The execution cluster(s) 260 includes a set of one or more execution circuits 262 and a set of one or more memory access circuits 264. The execution circuit 262 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler circuit(s) 256, physical register files 258, and execution cluster(s) 260 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s), and/or execution cluster—and in the case of a separate memory access pipeline, certain embodiments are implemented in which only the execution cluster of this pipeline has the memory access circuit(s) 264). It should also be understood that where separate pipelines are used, one or more of these pipelines may be out-of-order issue/execution and the rest in-order. As illustrated, feedback information may be provided from execution engine circuit 250 to branch prediction circuit 232 to provide feedback information, indicating whether branch instructions were correctly predicted or mispredicted, so that updating of prediction information can occur as described herein.

The set of memory access circuits 264 is coupled to the memory circuit 270, which includes a data TLB circuit 272 coupled to a data cache circuit 274 coupled to a level 2 (L2) cache circuit 276. In one exemplary embodiment, the memory access circuits 264 may include a load unit, a store address unit, and a store data unit, each of which is coupled to the data TLB circuit 272 in the memory circuit 270. The L2 cache circuit 276 is coupled to one or more other levels of cache and eventually to a main memory.

With reference back to FIG. 2A, by way of example, the exemplary register renaming, out-of-order issue/execution core architecture may implement the pipeline 200 as follows: 1) the instruction fetch circuit 238 performs the fetch and length decoding stages 202 and 204; 2) the decode circuit 240 performs the decode stage 206; 3) the rename/allocator circuit 252 performs the allocation stage 208 and renaming stage 210; 4) the scheduler circuit(s) 256 performs the schedule stage 212; 5) the physical register files 258 and the memory circuit 270 perform the register read/memory read stage 214; the execution cluster 260 performs the execute stage 216; 6) the memory circuit 270 and the physical register files 258 perform the write back/memory write stage 218; 7) various circuits may be involved in the exception handling stage 222; and 8) the retirement circuit 254 and the physical register files 258 perform the commit stage 224.

Core 290 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.); or possible other ISAs. It should be understood that core 290 may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units 234/274 and a shared L2 cache circuit 276, alternative embodiments may have a single internal cache for both instructions and data, such as, for example, a level 1 internal cache, or multiple levels of internal cache. In some embodiments, the system may include a combination of an internal cache and an external cache that is external to the core and/or the processor. Alternatively, all of the cache may be external to the core and/or the processor.

Figure 3:
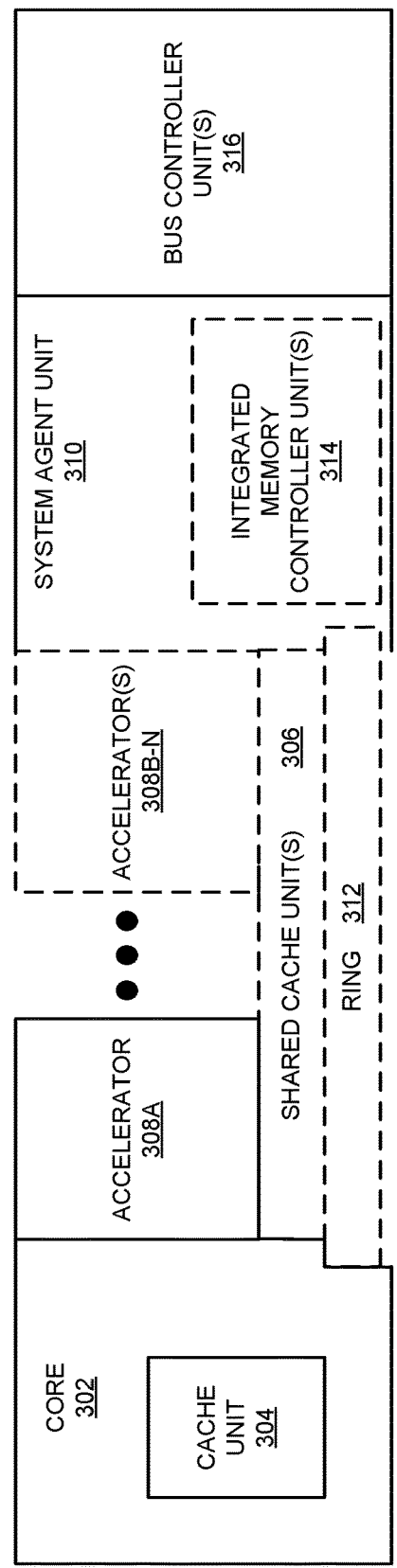
FIG. 3 is a block diagram of a processor with integrated memory controller and accelerator functionality according to embodiments.

FIG. 3 is a block diagram of a processor 300 with integrated memory controller and accelerator functionality according to embodiments. The solid lined boxes in FIG. 3 illustrate a processor 300 with a single core 302, a single accelerator 308A, a system agent unit 310, a set of one or more bus controller units 316, while the optional addition of the dashed lined boxes illustrates an alternative processor 300 with multiple accelerators 308B-N, and a set of one or more integrated memory controller unit(s) 314 in the system agent unit 310. At least core 302 may include a branch prediction circuit as described herein.

The memory hierarchy includes one or more levels of cache within the core 302 including a cache unit 304, a set or one or more shared cache units 306, and external memory (not shown) coupled to the set of integrated memory controller units 314. The set of shared cache units 306 may include one or more mid-level caches, such as level 2 (L2), level 3 (L3), level 4 (L4), or other levels of cache, a last level cache (LLC), and/or combinations thereof. While in one embodiment a ring-based interconnect unit 312 interconnects the accelerator(s) 308, the set of shared cache units 306, and the system agent unit 310, alternative embodiments may use any number of well-known techniques for interconnecting such units.

The system agent unit 310 includes those components coordinating and operating core 302 and accelerator(s) 308A-N. The system agent unit 310 may include for example a power control unit (PCU) and a display unit (not shown). The PCU may be or include logic and components to regulate the power state of the core 302 and accelerator(s) 308A-N. The display unit is for driving one or more externally connected displays.

While a single core embodiment is shown for ease of illustration, understand that multiple cores may be present. Such cores may be homogenous or heterogeneous in terms of architecture and/or instruction set. For example, some of the cores may be in-order while others are out-of-order. As another example, two or more of the cores may be capable of execution the same instruction set, while others may be capable of executing only a subset of that instruction set or a different instruction set.

The processor may be a general-purpose processor, such as a Core™ i3, i5, i7, 2 Duo and Quad, Xeon™, Itanium™, XScale™ or StrongARM™ processor, which are available from Intel Corporation, of Santa Clara, Calif. Alternatively, the processor may be from another company, such as ARM Holdings, Ltd, MIPS, etc. The processor may be a special-purpose processor, such as, for example, a network or communication processor, compression engine, graphics processor, co-processor, embedded processor, or the like. The processor may be implemented on one or more chips. The processor 300 may be a part of and/or may be implemented on one or more substrates using any of a number of process technologies, such as, for example, BiCMOS, CMOS, or NMOS.

Figure 4:
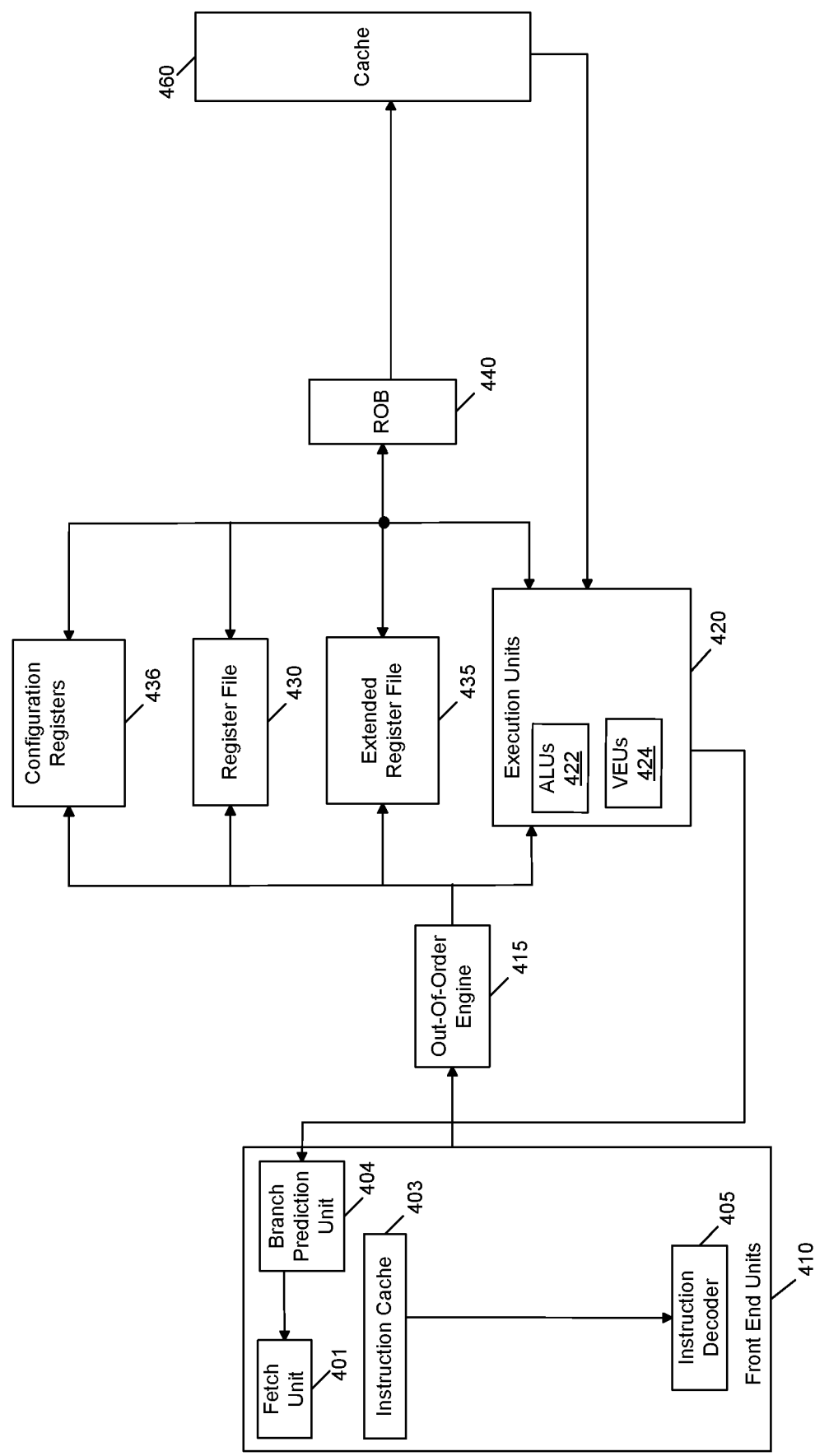
FIG. 4 is a block diagram of a micro-architecture of a processor core in accordance with one embodiment of the present invention.

Referring now to FIG. 4, shown is a block diagram of a micro-architecture of a processor core in accordance with one embodiment of the present invention. As shown in FIG. 4, processor core 400 may be a multi-stage pipelined out-of-order processor.

As seen in FIG. 4, core 400 includes front end units 410, which may be used to fetch instructions to be executed and prepare them for use later in the processor pipeline. For example, front end units 410 may include a fetch unit 401, an instruction cache 403, and an instruction decoder 405. Front end units 410 may further include a branch prediction unit 404, implemented as described herein. The resulting branch decision information can be provided to fetch unit 401 to direct the next IP to be fetched to obtain instructions for execution within processor 400. As further illustrated, feedback information may be received by branch prediction unit 404 to indicate whether corresponding branch predictions were correctly predicted or mispredicted. Such information may be provided from corresponding execution units 420, described further below. In some implementations, front end units 410 may further include a trace cache, along with microcode storage as well as a micro-operation storage. Fetch unit 401 may fetch macro-instructions, e.g., from memory or instruction cache 403, and feed them to instruction decoder 405 to decode them into primitives, i.e., micro-operations for execution by the processor.

Coupled between front end units 410 and execution units 420 is an out-of-order (OOO) engine 415 that may be used to receive the micro-instructions and prepare them for execution. More specifically OOO engine 415 may include various buffers to re-order micro-instruction flow and allocate various resources needed for execution, as well as to provide renaming of logical registers onto storage locations within various register files such as register file 430 and extended register file 435. Register file 430 may include separate register files for integer and floating point operations. Extended register file 435 may provide storage for vector-sized units, e.g., 256 or 512 bits per register. As further illustrated in FIG. 4, core 400 also includes a set of configuration registers 436, which may include various configuration registers to configure modes of operation and execution within core 400.

Various resources may be present in execution units 420, including, for example, various integer, floating point, and single instruction multiple data (SIMD) logic units, among other specialized hardware. For example, such execution units may include one or more arithmetic logic units (ALUs) 422 and one or more vector execution units 424, among other such execution units.

Results from the execution units may be provided to retirement logic, namely a reorder buffer (ROB) 440. More specifically, ROB 440 may include various arrays and logic to receive information associated with instructions that are executed. This information is then examined by ROB 440 to determine whether the instructions can be validly retired and result data committed to the architectural state of the processor, or whether one or more exceptions occurred that prevent a proper retirement of the instructions. Of course, ROB 440 may handle other operations associated with retirement.

As shown in FIG. 4, ROB 440 is coupled to a cache 460 which, in one embodiment may be a low level cache (e.g., an L1 cache), although the scope of the present invention is not limited in this regard. As further shown in FIG. 4, execution units 420 can be directly coupled to cache 460. From cache 460, data communication may occur with higher level caches, system memory and so forth. While shown with this high level in the embodiment of FIG. 4, understand the scope of the present invention is not limited in this regard. For example, while the implementation of FIG. 4 is with regard to an out-of-order machine such as of an Intel® x86 ISA, the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry.

In one embodiment, the following actions are taken on every branch execution: (1) update the shadow bimodal predictor based on the branch's resolved direction; and (2) update the MT entry counter corresponding to the branch IP. The monitoring table entry counter is set probabilistically if the shadow bimodal predictor was correct, and is reset on a shadow bimodal misprediction.

Figure 5:
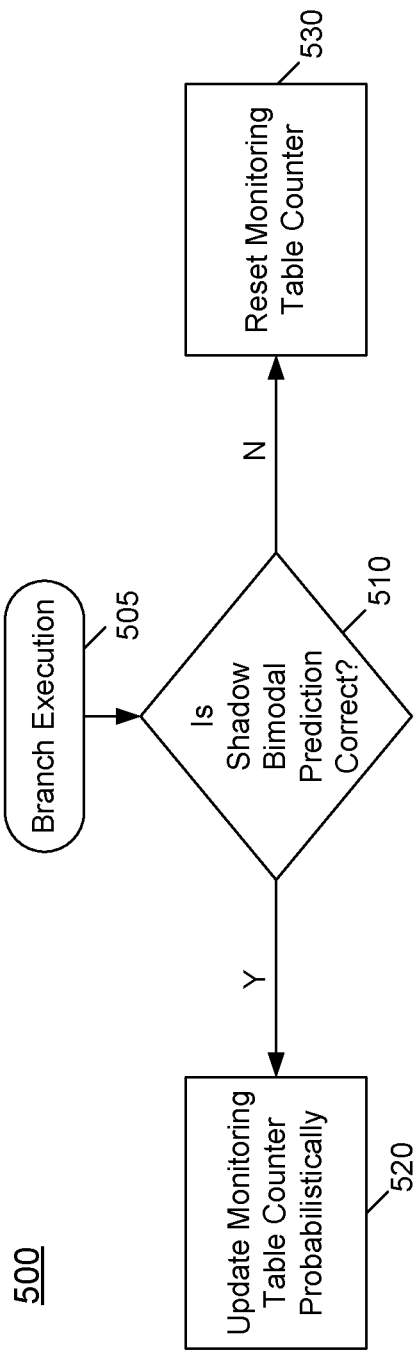
FIG. 5 is a flow diagram of a method in accordance with an embodiment of the present invention.

Referring now to FIG. 5, shown is a flow diagram of a method in accordance with an embodiment of the present invention. More specifically, method 500 is a flow diagram of a method for updating a monitoring table in accordance with an embodiment. As such, method 500 may be performed by hardware circuitry, software, firmware and/or combinations thereof. In one particular embodiment, method 500 may be performed at least in part by circuitry within comparator 160 of FIG. 1. As seen, method 500 begins in response to branch execution in an execution circuit of the processor. More specifically, the execution circuit may provide feedback information regarding prediction correctness or misprediction to the comparator (block 505). In turn at diamond 510 the comparator may determine whether the shadow bimodal prediction for this branch execution was correct. In an embodiment, this determination may be made within comparator 160 of FIG. 1 based on the prediction received from shadow bimodal predictor 110, as compared to the feedback information from the execution circuit. If it is determined that the shadow bimodal prediction is correct, control passes to block 520.

As illustrated, at block 520 a counter of the monitoring table entry associated with this branch execution may be updated probabilistically. That is, in embodiments rather than deterministically updating the counter in response to a correct prediction, a probabilistic update to the counter occurs. Although the scope of the present invention is not limited in this regard in an embodiment, this probabilistic counter update may occur once per every 256 attempts. To this end, a comparator or other control circuit may include pseudo-random number generation logic to determine whether to update the counter. Furthermore, while this example uses a probabilistic determination with a ratio of 1:256, understand the scope of the present invention is not limited in this aspect and other probabilities may be used. And in an embodiment in which the monitoring table entries include a saturating counter, the probabilistic update (when it actually occurs) may be by way of setting the counter value to its saturation value (e.g., setting a single bit in the instance of a one-bit saturating counter). This saturating counter may saturate at a maximum value and not wrap around on a further increment. In other cases, the counter may include multiple bits and may be a saturating or non-saturating counter, such that the update is by way of an increment of the counter.

Still with reference to FIG. 5, instead if it is determined that the shadow bimodal prediction is not correct, control passes to block 530 where the monitoring table counter for the entry associated with the branch execution is reset. Understand while shown at this high level in the embodiment of FIG. 5, many variations and alternatives are possible. For example, where the monitoring table counter is multi-bit width, instead of resetting the counter, a decrement of the counter value may occur in response to a misprediction by the shadow bimodal predictor.

In an embodiment, the following actions are taken when a determination is made, e.g., in response to a misprediction, that a new g-table entry is to be allocated for a particular branch: (1) if the corresponding MT saturating counter is at its maximum value, then a new g-table entry is not allocated; and (2) if the corresponding MT saturating counter is not at its maximum value, allocation of a g-table entry may be attempted. That is, when the corresponding entry of the monitoring table indicates that the shadow bimodal predictor sufficiently correctly predicts the branch instruction (and thus by replica the local predictor also sufficiently correctly predicts branch direction), future predictions may adequately be made using the local prediction resources only, saving the expense of allocating one or more global prediction entries for the given branch instruction.

Figure 6:
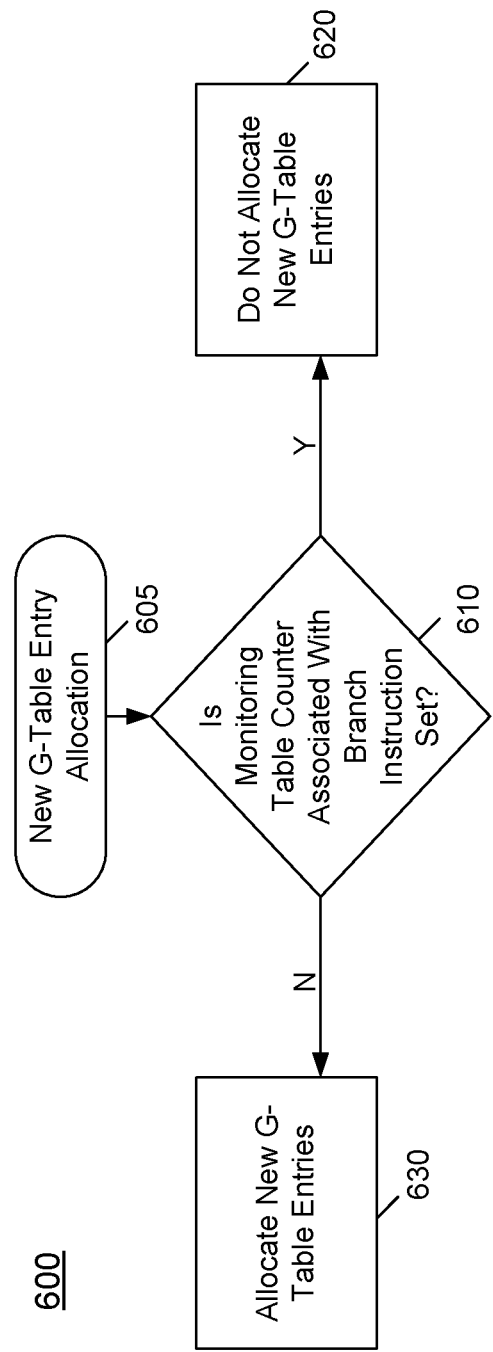
FIG. 6 is a flow diagram of a method in accordance with another embodiment of the present invention.

Referring now to FIG. 6, shown is a flow diagram of a method in accordance with another embodiment of the present invention. More specifically, method 600 of FIG. 6 is a method for allocating entries within a global predictor. As such, method 600 may be performed by hardware circuitry, software, firmware and/or combinations thereof, such as a control circuit, which may be implemented within a comparator (as discussed above), within a monitoring table, within the global predictor or a separate controller (or combinations thereof). As illustrated, method 600, which may be performed at least in part by control logic of a monitoring table, begins with a determination of allocation of a new entry within one or more global tables (block 605). In embodiments, this determination of a new global table entry may be in response to at least one misprediction by a local or global predictor. In an embodiment, if a g-table gave the prediction and a misprediction occurred, then allocation may be attempted only in the higher g-tables. As seen, control next passes to diamond 610 to determine whether a counter of the corresponding entry of the monitoring table associated with this (mispredicted) branch instruction is set. If the entry counter is set, control passes to block 620 where no entry is allocated within entries of the global predictor. That is, while a misprediction may have been incurred due to a misprediction within the local predictor, by way of the strength of the information present in the monitoring table (which in turn is derived based on the shadow bimodal predictor), a new entry is not allocated within the global predictor.

Instead if it is determined that the monitoring table counter for the corresponding entry is not set, control passes to block 630 where a new entry within one or more global tables may be allocated. Understand while described as an actual allocation, in many embodiments, the actual operation at block 330 initially may be communication of an allocation signal, e.g., from the monitoring table to the global predictor. In turn the global predictor itself may make a final determination as to whether an entry is to be allocated. Stated another way, an allocation determination may occur within the global predictor, such that an actual allocation may not occur where a victim entry (which may be selected randomly) is determined to include useful prediction information. In one embodiment, each g-table entry has a useful counter to track its usefulness. A g-table entry is deemed useful if it is the g-table entry with the shortest history length that gives the right prediction for that IP instance, and thus may have its useful counter updated. As such, in these embodiments block 630 instead may proceed by attempting to allocate a new entry within one or more global tables. However, depending upon the determination of control logic within the global predictor, this allocation may or may not successfully complete. Understand while shown at this high level in the embodiment of FIG. 6, many variations and alternatives are possible.

Figure 7:
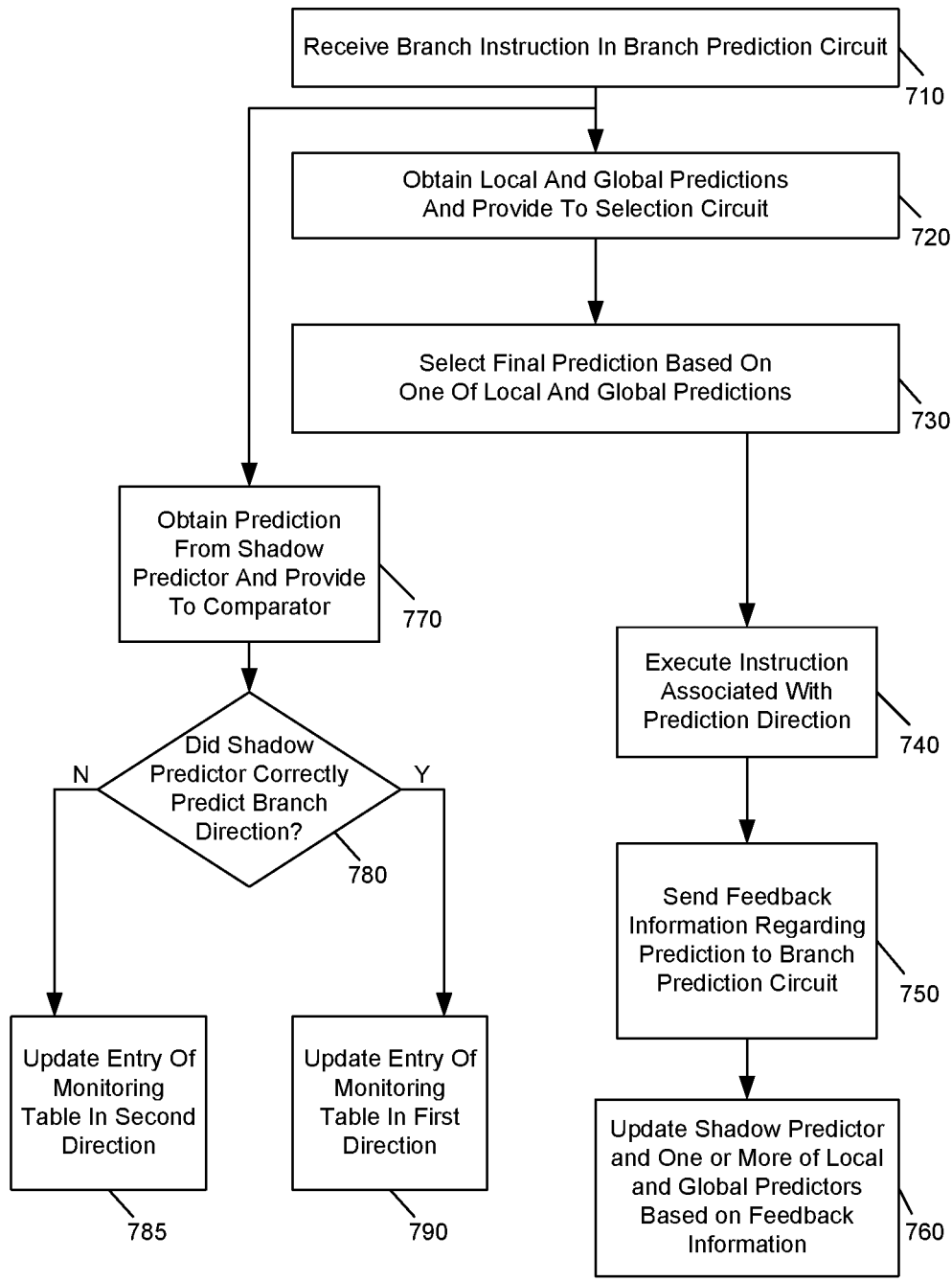
FIG. 7 is a flow diagram of a method in accordance with another embodiment of the present invention.

Referring now to FIG. 7, shown is a flow diagram of a method in accordance with another embodiment of the present invention. More specifically, method 700 shown in FIG. 7 is a method for execution of instructions in a processor using a branch predictor as described herein. As such, method 700 may be performed by various hardware circuitry, firmware and/or software of the processor, including a branch predictor as described herein, execution circuitry and so forth.

As illustrated, method 700 begins by receiving a branch instruction in the branch prediction circuit (block 710). Based on this branch instruction, local and global predictions for the instruction pointer address associated with this branch instruction may be obtained and provided to a selection circuit (block 720). Understand that in embodiments as above, these local predictions may be a local branch predictor implemented as a bimodal predictor and the global predictor may be implemented as one or more global tables. Next at block 730 a final prediction may be selected based on at least one of these two predictions. In some embodiments, assuming that there is a global prediction for the corresponding branch instruction, the selection circuit may select this global prediction (namely the highest available global component) as the final prediction output. In other cases, other manners of determining a prediction based on both local and global predictions may occur. For example, a majority voting scenario or a weighted average based on the confidence of every predicting component may occur, or so forth. In any event, the resulting final prediction is sent to fetch or other front end circuitry of the processor such that an instruction associated with the direction of prediction can be obtained and provided to execution circuitry of the processor. As such, control next passes to block 740 where the instruction associated with the prediction direction can be executed. Understand that further operations with regard to the execution, including determining whether the predicted direction was correct may occur. Control next passes to block 750 where feedback information may be sent (e.g., from an execution circuit) to the branch prediction circuit regarding the prediction. This feedback information indicates whether the corresponding prediction was correct or was a misprediction.

Still with reference to FIG. 7, at block 760 the shadow predictor and at least one or more of the local and global predictors may be updated based on this feedback information. For example, assuming a correct prediction, the entries of the shadow predictor and the given one of the local and global predictors that provided the prediction may be updated by way of an increment of the counter value of the entries. And similarly, on a misprediction, such entries may be decremented or reset.

Still with reference to FIG. 7, note that the received branch instruction also may trigger the obtaining of a prediction from the shadow predictor (block 770). Note that this shadow predictor prediction is not used in generating a final prediction output. Instead, this prediction may be used as a replica to indicate accuracy of the local predictor. As seen, control next passes to diamond 780 to determine whether the shadow predictor correctly predicted branch direction. If so, control passes to block 790 where a corresponding entry of a monitoring table of the branch prediction circuit may be updated in a first direction (e.g., the counter of the given entry may be incremented or otherwise set). Instead, upon a misprediction by the shadow predictor, control passes to block 785 where the entry of the monitoring table may be updated in a second direction (e.g., a decrement or reset of the counter). As discussed above, the value of the counter in entries in the monitoring table may be used to identify when it is appropriate to allocate an entry into the global predictor, such as upon a misprediction event for the local predictor. Understand while shown at this high level in the embodiment of FIG. 7, many variations and alternatives are possible.

Figure 8:
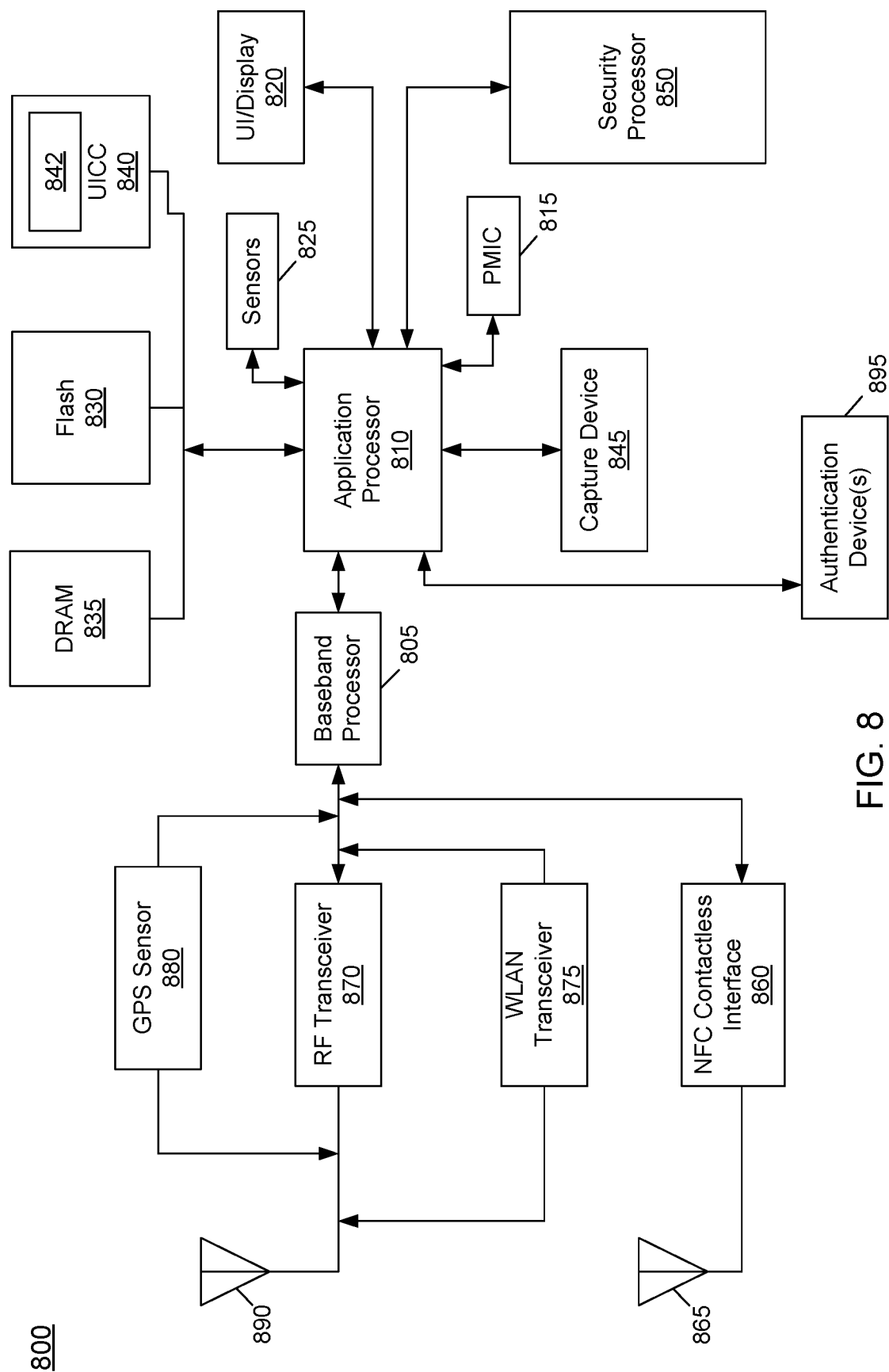
FIG. 8 is a block diagram of an example system with which embodiments can be used.

Embodiments may be implemented in many different system types, ranging from small portable devices to large server systems and device types in between. Referring now to FIG. 8, shown is a block diagram of an example system with which embodiments can be used. As seen, system 800 may be a smartphone or other wireless communicator or any other Internet of Things (IoT) device. A baseband processor 805 is configured to perform various signal processing with regard to communication signals to be transmitted from or received by the system. In turn, baseband processor 805 is coupled to an application processor 810, which may be a main CPU of the system to execute an OS and other system software, in addition to user applications such as many well-known social media and multimedia applications. Application processor 810 may further be configured to perform a variety of other computing operations for the device. In embodiments, application processor 810 may include a branch predictor as described herein. More specifically, the branch predictor may leverage information from a shadow predictor and, based at least in part on a determination of accuracy of predictions made solely using the local branch predictor, constrain allocations into a global predictor as described herein.

In turn, application processor 810 can couple to a user interface/display 820, e.g., a touch screen display. In addition, application processor 810 may couple to a memory system including a non-volatile memory, namely a flash memory 830 and a system memory, namely a DRAM 835. As further seen, application processor 810 also couples to a capture device 845 such as one or more image capture devices that can record video and/or still images.

Still referring to FIG. 8, a universal integrated circuit card (UICC) 840 comprises a subscriber identity module, which in some embodiments includes a secure storage 842 to store secure user information. System 800 may further include a security processor 850 that may implement a trusted executed environment (TEE), and which may couple to application processor 810.

A plurality of sensors 825, including one or more multi-axis accelerometers may couple to application processor 810 to enable input of a variety of sensed information such as motion and other environmental information. In addition, one or more authentication devices 895 may be used to receive, e.g., user biometric input for use in authentication operations. As further illustrated, a near field communication (NFC) contactless interface 860 is provided that communicates in a NFC near field via an NFC antenna 865. While separate antennae are shown in FIG. 8, understand that in some implementations one antenna or a different set of antennae may be provided to enable various wireless functionality.

A power management integrated circuit (PMIC) 815 couples to application processor 810 to perform platform level power management. To this end, PMIC 815 may issue power management requests to application processor 810 to enter certain low power states as desired. Furthermore, based on platform constraints, PMIC 815 may also control the power level of other components of system 800.

To enable communications to be transmitted and received such as in one or more wireless networks, various circuitry may be coupled between baseband processor 805 and an antenna 890. Specifically, a radio frequency (RF) transceiver 870 and a wireless local area network (WLAN) transceiver 875 may be present. In general, RF transceiver 870 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 880 may be present. Other wireless communications such as receipt or transmission of radio signals, e.g., AM/FM and other signals may also be provided. In addition, via WLAN transceiver 875, local wireless communications, such as according to a Bluetooth™ or IEEE 802.11 standard can also be realized.

Figure 9:
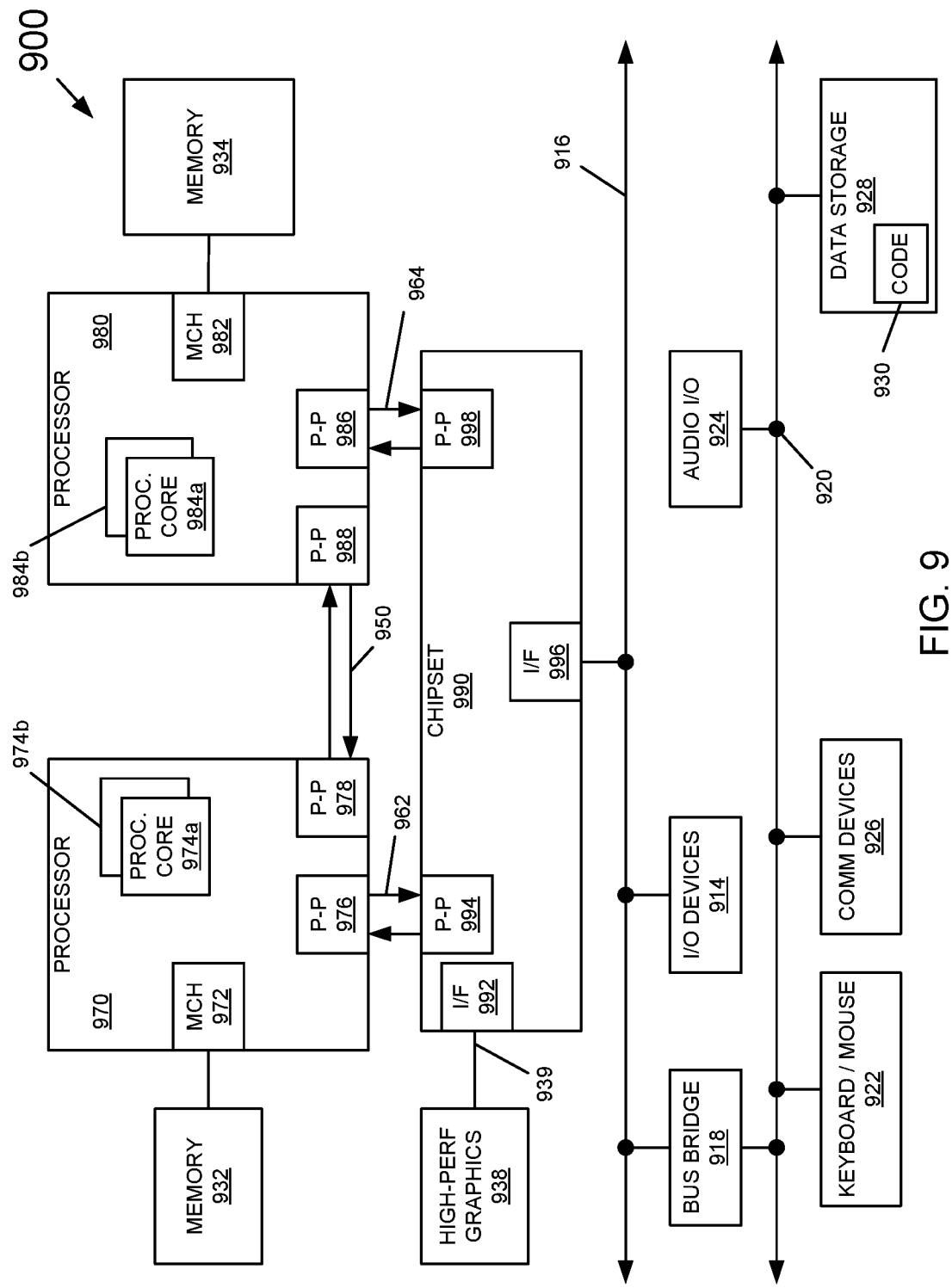
FIG. 9 is a block diagram of a system in accordance with another embodiment of the present invention.

Referring now to FIG. 9, shown is a block diagram of a system in accordance with another embodiment of the present invention. As shown in FIG. 9, multiprocessor system 900 is a point-to-point interconnect system such as a server system, and includes a first processor 970 and a second processor 980 coupled via a point-to-point interconnect 950. As shown in FIG. 9, each of processors 970 and 980 may be multicore processors such as SoCs, including first and second processor cores (i.e., processor cores 974a and 974b and processor cores 984a and 984b), although potentially many more cores may be present in the processors. The various processor cores of processors 970 and 980 may include branch predictors as described herein. Such branch predictors may include local and global predictors, as well as at least one shadow or replica predictor to maintain information regarding accuracy of predictions made by the local predictor. Based at least in part on such information, allocations into the global predictor may be constrained or limited, freeing resource allocation within the global predictor, as described herein.

Still referring to FIG. 9, first processor 970 further includes a memory controller hub (MCH) 972 and point-to-point (P-P) interfaces 976 and 978. Similarly, second processor 980 includes a MCH 982 and P-P interfaces 986 and 988. As shown in FIG. 9, MCH's 972 and 982 couple the processors to respective memories, namely a memory 932 and a memory 934, which may be portions of main memory (e.g., a DRAM) locally attached to the respective processors. First processor 970 and second processor 980 may be coupled to a chipset 990 via P-P interconnects 952 and 954, respectively. As shown in FIG. 9, chipset 990 includes P-P interfaces 994 and 998.

Furthermore, chipset 990 includes an interface 992 to couple chipset 990 with a high performance graphics engine 938, by a P-P interconnect 939. In turn, chipset 990 may be coupled to a first bus 916 via an interface 996. As shown in FIG. 9, various input/output (I/O) devices 914 may be coupled to first bus 916, along with a bus bridge 918 which couples first bus 916 to a second bus 920. Various devices may be coupled to second bus 920 including, for example, a keyboard/mouse 922, communication devices 926 and a data storage unit 928 such as a non-volatile storage or other mass storage device. As seen, data storage unit 928 may include code 930, in one embodiment. As further seen, data storage unit 928 also includes a trusted storage 929 to store sensitive information to be protected. Further, an audio I/O 924 may be coupled to second bus 920.

Figure 10:
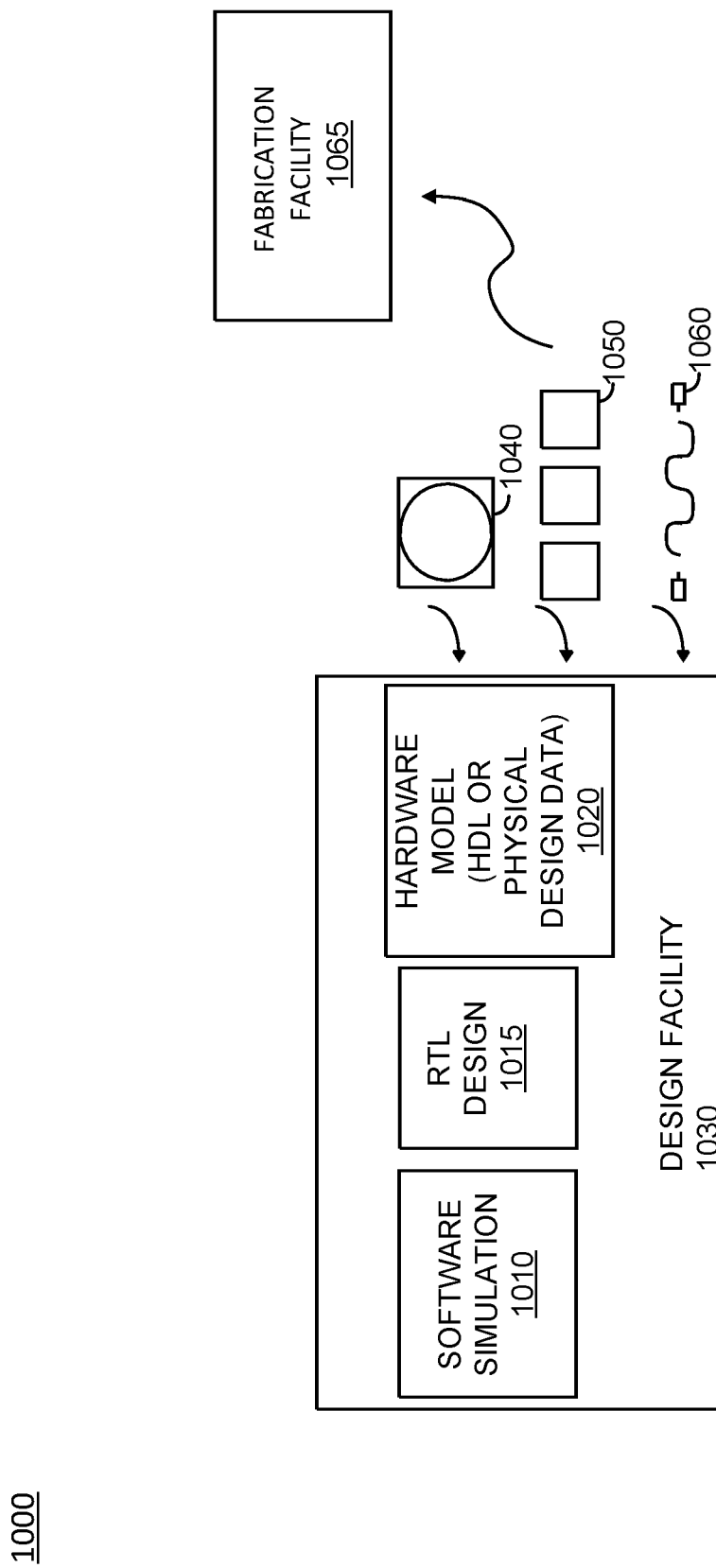
FIG. 10 is a block diagram illustrating an IP core development system used to manufacture an integrated circuit to perform operations according to an embodiment.

FIG. 10 is a block diagram illustrating an IP core development system 1000 that may be used to manufacture an integrated circuit to perform operations according to an embodiment. The IP core development system 1000 may be used to generate modular, re-usable designs that can be incorporated into a larger design or used to construct an entire integrated circuit (e.g., an SoC integrated circuit). A design facility 1030 can generate a software simulation 1010 of an IP core design in a high level programming language (e.g., C/C++). The software simulation 1010 can be used to design, test, and verify the behavior of the IP core. A register transfer level (RTL) design can then be created or synthesized from the simulation model. The RTL design 1015 is an abstraction of the behavior of the integrated circuit that models the flow of digital signals between hardware registers, including the associated logic performed using the modeled digital signals. In addition to an RTL design 1015, lower-level designs at the logic level or transistor level may also be created, designed, or synthesized. Thus, the particular details of the initial design and simulation may vary.

The RTL design 1015 or equivalent may be further synthesized by the design facility into a hardware model 1020, which may be in a hardware description language (HDL), or some other representation of physical design data. The HDL may be further simulated or tested to verify the IP core design. The IP core design can be stored for delivery to a third party fabrication facility 1065 using non-volatile memory 1040 (e.g., hard disk, flash memory, or any non-volatile storage medium). Alternately, the IP core design may be transmitted (e.g., via the Internet) over a wired connection 1050 or wireless connection 1060. The fabrication facility 1065 may then fabricate an integrated circuit that is based at least in part on the IP core design. The fabricated integrated circuit can be configured to perform operations in accordance with at least one embodiment described herein.

The following examples pertain to further embodiments.

In an example, an apparatus comprises: a first local predictor circuit having a first plurality of entries each to store local prediction information for a corresponding branch instruction; a global predictor circuit having a plurality of global entries each to store global prediction information for a corresponding branch instruction; and a second local predictor circuit having a second plurality of entries each to store second local prediction information for a corresponding branch instruction, wherein an entry of the second local predictor circuit is to be updated in response to every execution of the corresponding branch instruction.

In an example, the apparatus further comprises a comparator to determine whether a first entry of the second plurality of entries of the second local predictor circuit provided a correct prediction for the corresponding branch instruction, based at least in part on feedback information regarding branch execution of the corresponding branch instruction.

In an example, the apparatus further comprises a monitoring table coupled to the comparator, the comparator to probabilistically update the monitoring table based at least in part on the determination.

In an example, the comparator is to probabilistically increment a counter of an entry of the monitoring table in response to a determination of a correct prediction by the second local predictor circuit.

In an example, the apparatus further comprises a control circuit to prevent allocation of an entry in the global predictor circuit for a first branch instruction in response to a misprediction of the first branch instruction by the first local predictor circuit, when a value of an entry of the monitoring table associated with the first branch instruction exceeds a threshold.

In an example, the control circuit is to request allocation of the entry in the global predictor circuit for the first branch instruction in response to the misprediction of the first branch instruction by the first local predictor circuit, when the value of the entry of the monitoring table associated with the first branch instruction is less than the threshold.

In an example, the global predictor circuit is to prevent the allocation of the global entry in response to the allocation request based at least in part on prediction information of a victim entry.

In an example, the probabilistic increment is according to a predetermined ratio.

In an example, the comparator is to reset a counter of an entry of the monitoring table in response to a determination of a misprediction by the second local predictor circuit.

In an example, the apparatus further comprises a target array including a plurality of entries to store target information, wherein at least some of the plurality of entries of the target array are to store at least some counter information of the first plurality of entries of the first local predictor circuit.

In an example, the at least some of the plurality of entries of the target array are to store at least some prediction information of the monitoring table.

In another example, a method comprises: receiving, in a branch predictor of a processor, feedback information regarding execution of a branch instruction from an execution circuit of the processor; upon a determination that the feedback information indicates that an entry of a shadow bimodal predictor of the branch predictor correctly predicted the branch instruction, probabilistically updating a counter of an entry of a monitoring table of the branch predictor, the entry associated with the branch instruction; and allocating a new entry in a global predictor of the branch predictor in response to a misprediction regarding the branch instruction by a local predictor when the counter of the entry of the monitoring table is less than a threshold.

In an example, probabilistically updating the counter comprises probabilistically setting the counter.

In an example, the method further comprises probabilistically updating the counter according to a predetermined ratio.

In an example, the method further comprises decrementing the counter of the monitoring table entry in response to a misprediction regarding the branch instruction by the shadow bimodal predictor.

In an example, the method further comprises preventing allocation of an entry for the branch instruction within the global predictor when the value of the counter of the monitoring table entry exceeds the threshold.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In another example, a processor comprises a branch prediction circuit that includes: a first bimodal predictor having a first plurality of entries each to store first prediction information for a corresponding branch instruction; a global predictor having a plurality of global entries each to store global prediction information for a corresponding branch instruction; a second bimodal predictor having a second plurality of entries each to store second prediction information for a corresponding branch instruction; a monitoring table having a plurality of monitoring entries each to store a counter value based on the second prediction information for a corresponding branch instruction; and a control circuit to allocate a global entry within the global predictor based at least in part on the counter value of a monitoring entry of the monitoring table for a corresponding branch instruction. The processor may further include an execution circuit to execute instructions and provide feedback information regarding branch instructions to the branch prediction circuit.

In an example, the processor further comprises a comparator to determine whether a first entry of the second plurality of entries of the second bimodal predictor provided a correct prediction for the corresponding branch instruction, based at least in part on the feedback information.

In an example, the comparator is to probabilistically update a first monitoring entry of the monitoring table based at least in part on the determination.

In an example, the control circuit is to: allocate the global entry within the global predictor for the corresponding branch instruction when a counter value of a first monitoring entry of the monitoring table for the corresponding branch instruction is less than a threshold; and prevent allocation of the global entry within the global predictor for the corresponding branch instruction when the counter value of the first monitoring entry of the monitoring table for the corresponding branch instruction exceeds the threshold.

In an example, an apparatus comprises: first predictor means having a first plurality of entries each to store local prediction information for a corresponding branch instruction; global predictor means having a plurality of global entries each to store global prediction information for a corresponding branch instruction; and second local predictor means having a second plurality of entries each to store second local prediction information for a corresponding branch instruction, wherein an entry of the second local predictor is to be updated in response to every execution of the corresponding branch instruction.

In an example, the apparatus further comprises comparator means for determining whether a first entry of the second plurality of entries of the second predictor means provided a correct prediction for the corresponding branch instruction, based at least in part on feedback information regarding branch execution of the corresponding branch instruction.

In an example, the apparatus further comprises monitoring means for probabilistically maintaining information regarding a determination by the comparator means.

In an example, the apparatus further comprises control means for preventing allocation of an entry in the global predictor means for a first branch instruction in response to a misprediction of the first branch instruction by the first predictor means.

In an example, the control means is to prevent the allocation when the probabilistically maintained information associated with the first branch instruction exceeds a threshold.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
    a first local predictor circuit having a first plurality of entries each to store local prediction information for a corresponding branch instruction;
    a global predictor circuit having a plurality of global entries each to store global prediction information for a corresponding branch instruction;
    a second local predictor circuit having a second plurality of entries each to store second local prediction information for a corresponding branch instruction, wherein an entry of the second local predictor circuit is to be updated in response to every execution of the corresponding branch instruction; and
    a comparator to determine whether a first entry of the second plurality of entries of the second local predictor circuit provided a correct prediction for the corresponding branch instruction, based at least in part on feedback information regarding branch execution of the corresponding branch instruction.

2. The apparatus of claim 1, further comprising a monitoring table coupled to the comparator, the comparator to probabilistically update the monitoring table based at least in part on the determination.

3. The apparatus of claim 2, wherein the comparator is to probabilistically increment a counter of an entry of the monitoring table in response to a determination of a correct prediction by the second local predictor circuit.

4. The apparatus of claim 3, further comprising a control circuit to prevent allocation of an entry in the global predictor circuit for a first branch instruction in response to a misprediction of the first branch instruction by the first local predictor circuit, when a value of an entry of the monitoring table associated with the first branch instruction exceeds a threshold.

5. The apparatus of claim 4, wherein the control circuit is to request allocation of the entry in the global predictor circuit for the first branch instruction in response to the misprediction of the first branch instruction by the first local predictor circuit, when the value of the entry of the monitoring table associated with the first branch instruction is less than the threshold.

6. The apparatus of claim 5, wherein the global predictor circuit is to prevent the allocation of the global entry in response to the allocation request based at least in part on prediction information of a victim entry.

7. The apparatus of claim 3, wherein the probabilistic increment is according to a predetermined ratio.

8. The apparatus of claim 2, wherein the comparator is to reset a counter of an entry of the monitoring table in response to a determination of a misprediction by the second local predictor circuit.

9. The apparatus of claim 2, further comprising a target array including a plurality of entries to store target information, wherein at least some of the plurality of entries of the target array are to store at least some counter information of the first plurality of entries of the first local predictor circuit.

10. The apparatus of claim 9, wherein the at least some of the plurality of entries of the target array are to store at least some prediction information of the monitoring table.

11. A machine-readable medium having stored thereon instructions, which if performed by a machine cause the machine to perform a method comprising:
    receiving, in a branch predictor of a processor, feedback information regarding execution of a branch instruction from an execution circuit of the processor;
    upon a determination that the feedback information indicates that an entry of a shadow bimodal predictor of the branch predictor correctly predicted the branch instruction, probabilistically updating a counter of an entry of a monitoring table of the branch predictor, the entry associated with the branch instruction; and
    allocating a new entry in a global predictor of the branch predictor in response to a misprediction regarding the branch instruction by a local predictor when the counter of the entry of the monitoring table is less than a threshold.

12. The machine-readable medium of claim 11, wherein probabilistically updating the counter comprises probabilistically setting the counter.

13. The machine-readable medium of claim 11, wherein the method further comprises probabilistically updating the counter according to a predetermined ratio.

14. The machine-readable medium of claim 11, wherein the method further comprises decrementing the counter of the monitoring table entry in response to a misprediction regarding the branch instruction by the shadow bimodal predictor.

15. The machine-readable medium of claim 11, wherein the method further comprises preventing allocation of an entry for the branch instruction within the global predictor when the counter of the monitoring table entry exceeds the threshold.

16. A processor comprising:
    a branch prediction circuit comprising:
        a first bimodal predictor having a first plurality of entries each to store first prediction information for a corresponding branch instruction;
        a global predictor having a plurality of global entries each to store global prediction information for a corresponding branch instruction;

a second bimodal predictor having a second plurality of entries each to store second prediction information for a corresponding branch instruction;

a monitoring table having a plurality of monitoring entries each to store a counter value based on the second prediction information for a corresponding branch instruction; and a control circuit to allocate a global entry within the global predictor based at least in part on the counter value of a monitoring entry of the monitoring table for a corresponding branch instruction; and an execution circuit to execute instructions, wherein the execution circuit is to provide feedback information regarding branch instructions to the branch prediction circuit.

17. The processor of claim 16, further comprising a comparator to determine whether a first entry of the second plurality of entries of the second bimodal predictor provided a correct prediction for the corresponding branch instruction, based at least in part on the feedback information.

18. The processor of claim 17, wherein the comparator is to probabilistically update a first monitoring entry of the monitoring table based at least in part on the determination.

19. The processor of claim 16, wherein the control circuit is to:

allocate the global entry within the global predictor for the corresponding branch instruction when a counter value of a first monitoring entry of the monitoring table for the corresponding branch instruction is less than a threshold; and prevent allocation of the global entry within the global predictor for the corresponding branch instruction when the counter value of the first monitoring entry of the monitoring table for the corresponding branch instruction exceeds the threshold.

* * * * *